(12) United States Patent
Su et al.

(10) Patent No.: US 12,473,426 B2
(45) Date of Patent: Nov. 18, 2025

(54) COMPOSITE FUNCTIONALIZED ACRYLIC PROCESS AIDS FOR GLOSS AND SURFACE MODIFICATION

(71) Applicant: Arkema Inc., King of Prussia, PA (US)

(72) Inventors: Ya-Ting Su, Malvern, PA (US); Kevin Ryan Yocca, Schwenksville, PA (US); Eric Peterson, Rutledge, PA (US); Qing Li, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 71 days.

(21) Appl. No.: 17/853,532

(22) Filed: Jun. 29, 2022

(65) Prior Publication Data

US 2022/0348754 A1    Nov. 3, 2022

Related U.S. Application Data

(63) Continuation-in-part of application No. 17/551,253, filed on Dec. 15, 2021, now Pat. No. 12,202,960, which is a continuation of application No. 16/081,055, filed as application No. PCT/US2017/023707 on Mar. 23, 2017, now Pat. No. 11,220,596, application No. 17/853,532 is a continuation-in-part of application No. 16/650,397, filed as application No. PCT/US18/52624 on Sep. 28, 2018, now abandoned, application No. 17/853,532 is a continuation-in-part of application No. 15/969,885, filed on May 3, 2018, now Pat. No. 11,168,205, which is a continuation of application No. 14/741,496, filed on Jun. 17, 2015, now Pat. No. 9,988,524, which is a continuation of application No. 13/203,489, filed as application No. PCT/US2010/025171 on Feb. 24, 2010, now Pat. No. 9,085,679.

(60) Provisional application No. 62/313,187, filed on Mar. 25, 2016, provisional application No. 62/563,841, filed on Sep. 27, 2017, provisional application No. 61/155,573, filed on Feb. 26, 2009.

(51) Int. Cl.
*C08L 27/06* (2006.01)
*C08L 25/06* (2006.01)
*C08L 31/02* (2006.01)
*C08L 33/12* (2006.01)
*C08L 63/00* (2006.01)

(52) U.S. Cl.
CPC .............. *C08L 27/06* (2013.01); *C08L 25/06* (2013.01); *C08L 31/02* (2013.01); *C08L 33/12* (2013.01); *C08L 63/00* (2013.01); *C08L 2205/025* (2013.01); *C08L 2205/03* (2013.01); *C08L 2312/00* (2013.01)

(58) Field of Classification Search
CPC ............. C08F 220/14; C08F 220/1804; C08F 220/325; C08K 2003/265; C08K 3/26; C08L 23/04; C08L 2312/00; C08L 31/02; C08L 33/068; C08L 33/12
See application file for complete search history.

(56) References Cited

FOREIGN PATENT DOCUMENTS

KR    100660362 B1  *  12/2006

OTHER PUBLICATIONS

KR-100660362-B1 (Dec. 21, 2006) machine translation.*

* cited by examiner

*Primary Examiner* — Ana L. Woodward
(74) *Attorney, Agent, or Firm* — Debodhonyaa Sengupta

(57) ABSTRACT

A composite polymer process aid is provided. The process aid includes one or more inorganic mineral fillers and one or functionalized polymers. The functionalized polymers include at least one base polymer functionalized with an epoxy, hydroxyl, β-keto ester, β-keto amide, or carboxylic acid reactive functional group. The composite polymer process aid is in the form of a plurality of individual particles. At least a portion of the individual particles include both inorganic mineral fillers and the functionalized polymers. The composite polymer modifier is formed by a process of: i) blending an aqueous solution, an aqueous dispersion, an aqueous suspension, an aqueous slurry, or a dry powder of the mineral fillers with an aqueous solution, an aqueous dispersion, an aqueous suspension or an aqueous emulsion of the functionalized polymers to form an aqueous blend, and ii) powderizing the aqueous blend to form the composite polymer process aid.

19 Claims, 2 Drawing Sheets

COMPOSITE FUNCTIONALIZED ACRYLIC PROCESS AIDS FOR GLOSS AND SURFACE MODIFICATION

CROSS-REFERENCE TO RELATED APPLICATIONS

This application is a continuation in part of and claims priority to U.S. application Ser. No. 17/551,253, filed Dec. 15, 2021 which claims benefit to Ser. No. 16/081,055 filed Aug. 30, 2018, which is a national stage application under 35 U.S.C. § 371 of PCT/US201/7023707, filed Mar. 23, 2017, which claims priority to U.S. Provisional Application Ser. No. 62/313,187, filed on Mar. 25, 2016 (now U.S. Pat. No. 11,220,596, issued on Jan. 11, 2022), all of which are hereby incorporated by reference in their entirety for all purposes. This application is also a continuation in part of and claims priority to U.S. application Ser. No. 16/650,397 filed Mar. 25, 2020 which is a national stage application under 35 U.S.C. § 371 of PCT/US2018/052624 filed Sep. 25, 2018, which claims benefit to U.S. Provisional Application Ser. No. 62/563,841 filed Sep. 27, 2017, which is a continuation in part of and claims priority to U.S. application Ser. No. 15/969,885, filed May 3, 2018 (now U.S. Pat. No. 11,168,205, issued on Nov. 9, 2021) which is a continuation of U.S. application Ser. No. 14/741,496, filed Jun. 17, 2015 (now U.S. Pat. No. 9,988,524, issued on Jun. 5, 2018) which is a continuation of and claims priority to U.S. application Ser. No. 13/203,489, filed Aug. 26, 2011, now U.S. Pat. No. 9,085,679 (issued on Jul. 21, 2015), which is a national stage application under 35 U.S.C. § 371 of PCT/US2010/025171, filed Feb. 24, 2010, which claims priority to U.S. Provisional Application Ser. No. 61/155,573, filed on Feb. 26, 2009, all of which are hereby incorporated by reference in their entirety for all purposes.

FIELD OF THE INVENTION

The disclosure is directed to process aids for polyvinyl chloride (PVC) polymer formulations and other thermoplastic polymer formulations. The process aids provide a smooth, matte (low gloss) surface to PVC parts.

BACKGROUND

Polyvinyl chloride (PVC) resins are generally chemically inert, resistant to water and environmental corrosion, provide good electrical and thermal insulation, and can maintain performance over a large temperature range. The commercial polymerization processes and post-polymerization processing techniques (e.g., extrusion, injection molding, blow molding, etc.) used with polyvinyl chloride (PVC) or "vinyl" have matured over the past century. This manufacturing base along with the basic properties exhibited by PVC has led to a proliferation of PVC-containing products including for example vinyl windows. Vinyl products are durable and easily maintained. They are resistant to fungus and mildew growth and are not affected by rot, corrosion, cracking, flaking, or insect infestation. Vinyl products exhibit excellent fire resistance properties, which meet most building codes for ignitability, flammability, heat released, burning rate, flame spread, and smoke generation. Since vinyl products typically are the same color throughout, minor scratches do not require painting or repair, and the aesthetics are easily maintained by washing with soap and water. When properly installed and maintained, vinyl products provide long lasting aesthetics, reliable performance, and continued energy savings.

PVC formulations containing conventional process aids and no additional matting agent usually have a glossy surface; however, some applications require a low gloss surface. Functionalized process aids containing a reactive functional group are generally considered to be at least partially crosslinked. The partially crosslinked feature produces the desirable gloss reduction effect in thermoplastic polymers. However, the partially crosslinked nature tends to cause processing disadvantages due to the difficulty of dispersing the copolymer during processing. This, in turn, may result in undesirable shark skin and edge tearing during extrusion.

SUMMARY

The inventors have surprisingly found that by co-powderization of the functionalized polymer with a filler slurry, the resulting composite polymer process aids, when combined with PVC, provide similar or improved reductions in gloss and improved processing. Surprising results include better/improved dispersibility into PVC, which can enable the use of the composite polymer process aid of the invention at higher loading levels compared to use of the functionalized process aid alone in the PVC formulation. In addition, the composite polymer process aids of the invention provide a desirably lower-gloss surface to the extruded PVC composition, and reduction or even elimination of processing issues such as edge tearing and shark skin appearance of extruded PVC products. Furthermore, when the composite polymer process aid of the invention was added to a PVC formulation it generally did not affect the impact properties of the extruded sheet vs. a control, while also reducing surface gloss. This result is in contrast to commercial matting agents, that when added to PVC formulations reduce gloss but also generally may reduce impact properties.

A composite polymer process aid is provided. The composite process aid comprises, consists of, or consists essentially of: a) from 99 to 1 weight percent of one or more inorganic mineral fillers and b) from 1 to 99 weight percent of one or functionalized polymers The functionalized polymers comprise, consist of, or consist essentially of at least one base polymer functionalized with about 0.5 weight % to about 35 weight %, preferably about 1 weight % to about 25 weight %, more preferably 1 weight % to about 15 weight %, or preferably with about 2, 3, 4, or 5 weight % to about 15, 10, or 5 weight % of at least one of an epoxy, hydroxyl, β-keto ester, β keto amide, or carboxylic acid reactive functional group based on the total weight of the functionalized polymer. The composite polymer process aid is in the form of a plurality of individual particles. At least a portion of the individual particles comprise, consist of or consist essentially of both the a) one or more inorganic mineral fillers and the b) one or more functionalized polymers. The composite polymer process aid is formed by a process comprising, consisting of or consisting essentially of the steps of:
  i) blending the a) inorganic mineral fillers with the b) one or more functionalized polymers to form an aqueous blend, and
  ii) powderizing the aqueous blend to form the composite polymer process aid.

In order to form the aqueous blend, the a) one or more mineral fillers may be in the form of an aqueous solution, an aqueous dispersion, an aqueous suspension, an aqueous slurry, or a dry powder and the b) one or more functionalized polymers may be in the form of an aqueous solution, an aqueous dispersion, an aqueous suspension or an aqueous emulsion.

Also provided is a process for forming a composite polymer process aid. The process comprises, consists of or consists essentially of the following steps a) and b).

Step a) is blending components i) and ii) to form an aqueous blend. Component i) is an aqueous solution, an aqueous dispersion, an aqueous suspension, or an aqueous emulsion of one or more functionalized polymers comprising at least one base polymer functionalized with about 0.5 weight % to about 35 weight % of at least one of a reactive epoxy, hydroxyl, or carboxylic acid functional group based on the total weight of the functionalized polymer. Component ii) is one or more mineral fillers which may be in the form of an aqueous solution, an aqueous dispersion, an aqueous suspension, an aqueous emulsion, or a dry powder.

Step b) is powderizing the aqueous blend to form the composite polymer process aid. The composite polymer process aid comprises, consists of, or consists essentially of:
1) from 99 to 1 weight percent of the one or more inorganic mineral fillers, and
2) from 1 to 99 weight percent of the one or more functionalized polymers.

The composite polymer process aid formed by this process is in the form of a plurality of individual particles and at least a portion of the individual particles comprise both the a) one or more inorganic mineral fillers and the b) one or more functionalized polymers.

Further areas of applicability will become apparent from the description provided herein. It should be understood that the description and specific examples are intended for purposes of illustration only and are not intended to limit the scope of the present disclosure.

DETAILED DESCRIPTION

Figure 1A:
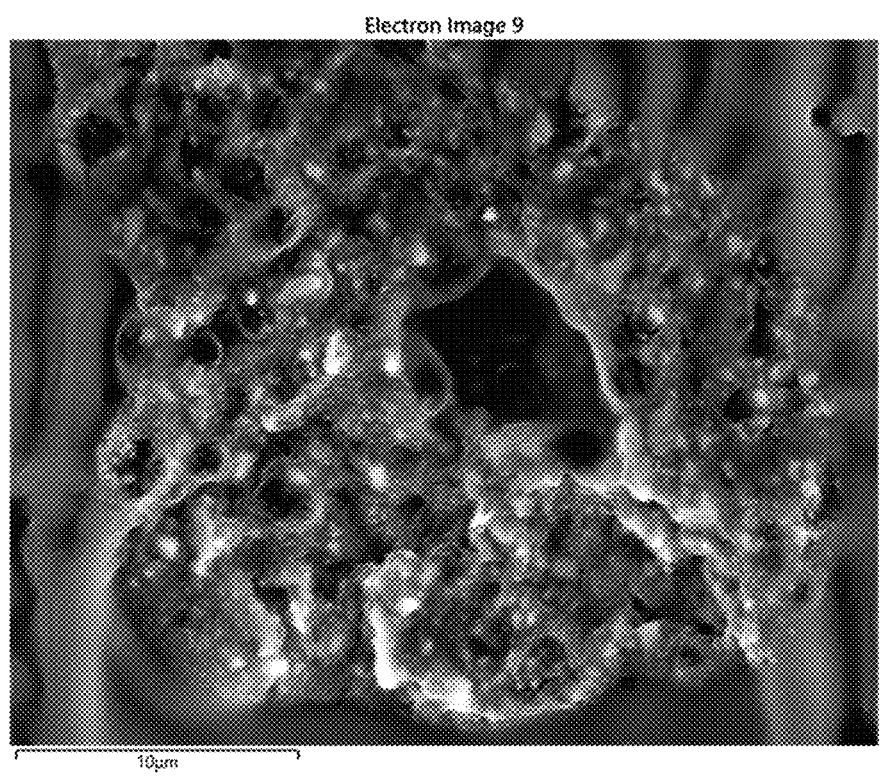
FIG. 1(a) shows Scanning Electron Microscopy (SEM) of a composite polymer process aid made according to the invention.
Figure 1:
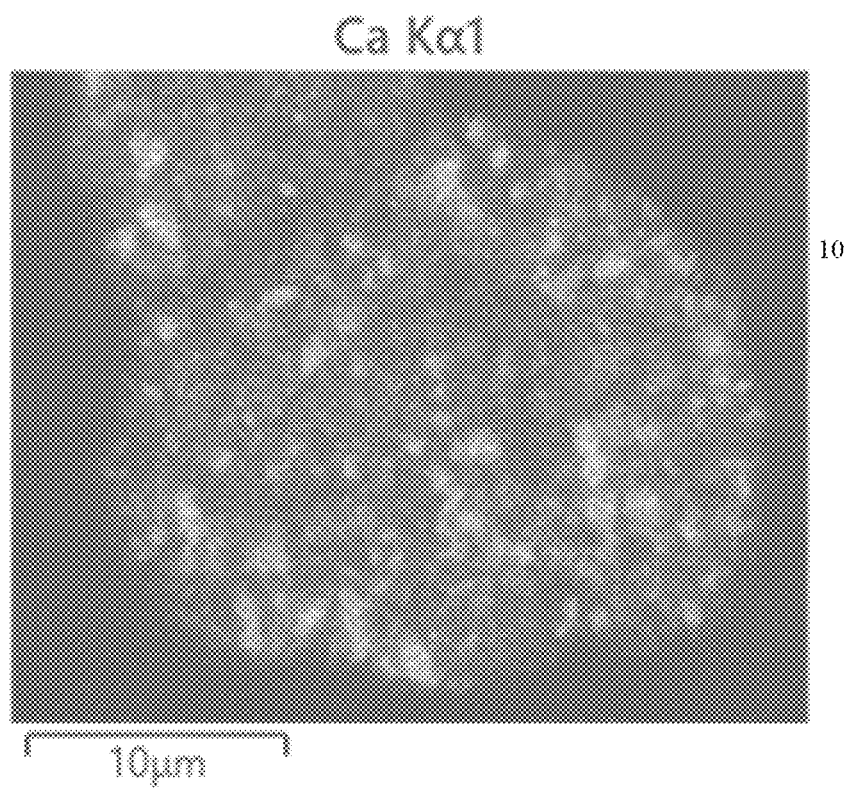
FIG. 1(b) shows the calcium mapping of a composite polymer process aid made according to the invention.

The present disclosure generally provides a polyvinyl chloride (PVC) or other thermoplastic resin component that exhibits reduced surface gloss without sacrificing mechanical properties. More specifically, the PVC or other thermoplastic resin component comprises, consists essentially of, or consists of a polyvinyl chloride (PVC) or other thermoplastic resin; one or more process aids, wherein at least one of the process aids is a composite polymer process aid including one or more inorganic mineral fillers and a polymer which is functionalized with about 0.5 weight % to about 35 weight % of a reactive epoxy, hydroxyl, or carboxylic acid functional group based on the total weight of the process aids.

The incorporation and use of such a PVC formulation that includes the inventive composite polymer process aid in other applications or products is contemplated to be within the scope of the present disclosure. Formulations made using other thermoplastic polymers/resins that include the inventive composite polymer process aid in other applications or products are also contemplated to be within the scope of the present disclosure. Such applications may include but not be limited to automotive products, building materials, household or kitchen items, medical or office supply products, apparel or packaging for personal care or other consumer products.

The use of the composite polymer process aid of the present disclosure also changes the haptic perception in certain thermoplastic articles where the inclusion of the inventive composite process aid also exhibits reduced surface gloss without sacrificing mechanical properties. These articles are made from semi-rigid PVC formulations which contain the inventive composite process aid, and are soft to the touch. This is in contrast to similar articles made from semi-rigid PVC formulations containing conventional process aids which have a plastic feel that one's finger does not easily slide across.

A composite polymer process aid is provided. The composite polymer process aid comprises, consists of, or consists essentially of: a) from 99 to 1 weight percent of one or more inorganic mineral fillers and b) from 1 to 99 weight percent of one or more functionalized polymers. The functionalized polymers comprise, consist of, or consist essentially of at least one base polymer functionalized with about 0.5 weight % to about 35 weight %, preferably about 1 weight % to about 25 weight %, more preferably 1 weight % to about 15 weight %, or preferably with about 2, 3, 4, or 5 weight % to about 15, 10, or 5 weight %, of at least one of an epoxy, hydroxyl, β-keto ester, β keto amide, or carboxylic acid reactive functional group based on the total weight of the functionalized polymer. The composite polymer process aid is in the form of a plurality of individual particles. At least a portion of the individual particles comprise, consist of, or consist essentially of both the a) one or more inorganic mineral fillers and the b) one or more functionalized polymers. The composite polymer process aid is formed by a process comprising, consisting of, or consisting essentially of the steps of:
i) blending a) the one or more mineral fillers with the b) one or more functionalized polymers to form an aqueous blend, and
ii) powderizing the aqueous blend to form the composite polymer process aid.

In order to form the aqueous blend, the a) one or more mineral fillers may be in the form of an aqueous solution, an aqueous dispersion, an aqueous suspension, an aqueous slurry, or a dry powder and the b) one or more functionalized polymers may be in the form of an aqueous solution, an aqueous dispersion, an aqueous suspension or an aqueous emulsion.

Inorganic Mineral Fillers

The composite polymer process aid may comprise from 99 to 1 weight percent, preferably 10 to 90 weight %, more preferably 20 to 80 weight %, of one or more inorganic mineral fillers. The composite polymer process aid may comprise at most 99, 95, 90, 85, 80, 75, 70, 65, 60, 55, 50, 45, 40, 35, 30, 25, 20, 15, 10, or 5 weight percent of one or more inorganic mineral fillers. The composite polymer process aid may comprise at least 1, 5, 10, 15, 20, 25, 30, 35, 40, 45, 50, 55, 60, 65, 70, 75, 80, 85, 90, or 95 weight percent of one or more inorganic mineral fillers.

These inorganic mineral fillers are in the form of solid particulates. The mineral filler for use in the invention may be treated or non-treated, and includes, but is not limited to, calcium carbonate, ground natural calcium carbonate (GCC), precipitated calcium carbonate (PCC), nanosized PCC (NPCC), silica (including fumed or precipitated silica), clays, Montmorillonite (nano-clay), zeolites, perlite, talc, mica, calcium metasilicate or any other type of inorganic material that can be obtained either as a slurry or as a dry powder. The mineral filler can also be a mixture of two or more different mineral fillers, such as both calcium carbonate and silica. In certain embodiments of the invention precipitated or ground calcium carbonate having an average particle size of from 50 nm to 5 microns may be utilized. Synthetic amorphous silica particles may be incorporated into the composite functionalized process aids to provide improved powder flow properties.

The mineral filler may comprise, consist of, or consist essentially of at least one of calcium carbonate, ground natural calcium carbonate (GCC), precipitated calcium carbonate (PCC), nanosized PCC (NPCC), fumed or precipitated silica, clay, Montmorillonite (nano-clay), zeolite, perlite, or mixtures thereof.

Functionalized Polymer Included in the Composite Process Aid

The composite polymer processing aids may include functionalized "acrylic" polymers or copolymers with a variety of different compositions and molecular weights. These functionalized polymers may be higher in molecular weight than the PVC resin or other thermoplastic resin into which they are included. In PVC resin specifically, because these functionalized polymers are very compatible with the PVC resin, they may assist with inter-particle mixing of the PVC particles at the beginning stages of fusion.

The functionalized polymers included in the composite polymer process aid of the present disclosure may be partially crosslinked and therefore may contain an insoluble fraction which cannot be dissolved completely in a good solvent. This insoluble portion can be separated by centrifugation. The soluble and insoluble fractions of the functionalized polymer included in the composite polymer process aids may be determined through the use of an extraction technique with a solvent, such as acetone, tetrahydrofuran (THF), or methyl ethyl ketone (MEK). The functionalized polymer included in the composite polymer process aid is dispersed and dissolved in acetone for 20 hours. After immersion in acetone, the solution is separated into soluble and insoluble fractions by centrifugation. See Example 2 herein for details. The Mw of the polymer in the soluble fraction is determined after drying described in the following paragraph. The fractions of insoluble and soluble portions are then calculated by weight. Based on acetone as the solvent, the insoluble fraction of the functionalized polymer included in the composite process aids ranges from 10 weight % to about 90 weight %, alternatively, the insoluble fraction ranges from about 20, 30, 40, or 50 weight % to about 85, 80, 75, 70, or 65 weight %; alternatively, the insoluble fraction ranges from about 50 weight % to about 90 weight %, preferably from about 60 to 80 weight %, more preferably about 70 to 85 weight %, even more preferably about 75 to 85 weight % based on the total weight of the functionalized polymer. The b) functionalized polymer may have an insoluble fraction of from 1 weight % to 90 weight % based on the total weight of the functionalized polymer.

In one embodiment, the functionalized polymer included in the composite polymer process aids of the invention surprisingly exhibit insolubility in organic solvents. The molecular weight measurements (Mw and Mn) are done on the soluble fraction of the functionalized polymer. The soluble fraction of the functionalized polymer included in the composite polymer process aids of the present disclosure may have a weight average molecular weight Mw (also called molar mass) that is greater than about 50,000 g/mol; alternatively, the weight average molecular weight of the soluble fraction of the functionalized polymer included in the composite polymer process aids is greater than about 100,000 g/mol; alternatively, the molecular weight (Mw) of the soluble fraction of the functionalized polymer included in the composite polymer process aids is about 250,000 g/mol or greater; alternatively, the (Mw) soluble fraction of the process aids is between about 50,000 g/mol to about 8 million g/mol, alternatively between about 750,000 g/mol to about 12 million g/mol. The molecular weight of the soluble fraction may be measured by any known method including but not limited to gel permeation chromatography (GPC).

The functionalized polymer included in the composite polymer process aids exhibit a glass transition temperature ($T_g$) that is greater than or equal to 0° C. and up to about 150° C.; alternatively, the $T_g$ of the process aids is within the range of about 30° C. to about 120° C., from about 50° C. to about 100° C., or from about 60° C. to about 85° C. The $T_g$ of the process aids can be measured either as powders or pressed bars formed from said powders using any known method, including but not limited to analysis by differential scanning calorimetry (DSC).

The functionalized polymer included in the composite polymer process aids comprise a base polymer or copolymer derived from ethylenically unsaturated monomers, including without limitation, vinyl- and (meth)acrylic-containing monomers, such as linear or branched alkyl esters of acrylic or methacrylic acid; styrene and styrene derivatives and mixtures thereof, with linear or branched alkyl esters of acrylic or methacrylic acid being preferred. Several specific examples of vinyl- and (meth)acrylic-containing monomers, include, but are not limited to, methyl(meth)acrylate, ethyl (meth)acrylate, n-butyl(meth)acrylate (BMA), 2-ethylhexyl (meth)acrylate, glycidyl(meth)acrylate, and mixtures thereof, with methyl(meth)acrylate, ethyl(meth)acrylate, and glycidyl(meth)acrylate being preferred. Alternatively, the base polymer or copolymer may be poly(methyl methacrylate), poly(butyl acrylate), poly(ethyl acrylate), poly (methyl methacrylate-styrene) copolymer, or a mixture thereof. Alternatively, the base polymer comprises preferred poly(methyl methacrylate) for compatibility with the PVC matrix. When desirable, other acrylates, such as poly(butyl acrylate) or poly(ethyl acrylate), can be added at a level of 5-50 weight %, 10-40 weight %, or 15-35 weight % to control the glass transition temperature ($T_g$) and fusion properties of the functionalized process aid.

At least one of the functionalized polymers included in the composite polymer process aids used in the PVC or other thermoplastic resin formulation to form a PVC or other thermoplastic resin component is functionalized with about 0.5 weight % to about 35 weight % of a reactive epoxy, hydroxyl, or carboxylic acid functional group based on the total weight of the process aids. Alternatively, the loading of the reactive group functionalization is between about 1 weight % and about 25 weight %; alternatively, the one or more functionalized polymer included in the composite process aids includes at least between about 5 weight % and about 20 weight % of the reactive functional groups based on the weight of the total weight of the functionalized polymer included in the composite process aids.

The functionalized polymer included in the composite process aids may be used in powder or particle form. This powder or the particles may be solid particles that comprise a base polymer that is substantially functionalized with the reactive groups or they may be pseudo core-shell particles. The functionalized polymer included in the composite polymer process aids may be prepared in a multi-step polymerization process such that the functionalized polymers resemble pseudo core-shell particles that comprise a core made of non-functionalized base polymer with at least part of said core being encapsulated with a shell that includes reactive epoxy, hydroxyl, or carboxylic acid functional groups. These functionalized polymers could also be prepared in such a way that the core is made of a functionalized base polymer that includes reactive epoxy, hydroxyl, or carboxylic acid functional groups and the shell is made of non-functionalized based polymer.

The reactive epoxy, hydroxyl, or carboxylic acid groups may be derived from the addition of epoxy, hydroxyl, or carboxylic acid containing monomers to the base polymer. Examples of such monomers include, but are not limited to, hydroxyl-substituted alkyl esters of (meth)acrylic acid, such as 2-hydroxyethyl(meth)acrylate; vinyl esters of linear or branched carboxylic acids, such as vinyl valerate, unsaturated carboxylic acids, including unsaturated $C_3$-$C_6$ monocarboxylic acids, such as acrylic acid (AA), and unsaturated C4-$C_6$ dicarboxylic acids, such as maleic acid and itaconic acid; and epoxy group-containing monomers, such as glycidyl acrylate or glycidyl methacrylate (GMA). Alternatively, the functional groups may be incorporated into the base polymer of the composite process aids through the addition of acrylic acid (AA), glycidyl methacrylate (GMA), which are most preferred, or a mixture thereof.

The at least one reactive functional group may be derived from one or more monomers comprising at least one of hydroxyl-substituted alkyl esters of (meth)acrylic acid; vinyl esters of linear or branched carboxylic acids; unsaturated $C_3$-$C_6$ monocarboxylic acids; unsaturated $C_4$-$C_6$ dicarboxylic acids; epoxy group—containing monomers; β-keto esters of (meth) acrylic acid; β-keto amides of (meth)acrylic acid, and mixtures thereof. The at least one functionalized polymer may be derived from one or more (meth) acrylic-containing monomers and, optionally, one or more co-monomers comprising at least one of vinyl-containing monomers, styrene and styrene derivatives, and mixtures thereof. The at least one functionalized polymer may comprise a co-polymer of at least one alkyl (meth) acrylate and at least one functionalized monomer comprising at least one of glycidyl (meth)acrylate and (meth)acrylic acid.

In the composite polymer process aid, at least one of the following conditions may exist: a) at least one of the one or more functionalized polymers is crosslinked; or b) at least one of the one or more functionalized polymers is capable of crosslinking with itself or a thermoplastic polymer.

Weight Ratio of Functionalized Polymer to Inorganic Mineral Filler

In the composite polymer process aid, the weight ratio of the functionalized polymer to the mineral filler may be from 75:1 to 1:50. In the composite polymer process aid, the weight ratio of the functionalized polymer to the mineral filler may be from 4:1 to 3:2. The weight ratio of the functionalized polymer to the mineral filler may be at most 75:1, 70:1, 65:1, 60:1, 55:1, 50:1, 45:1, 40:1, 35:1, 30:1, 25:1, 20:1, 15:1, 10:1, 5:1, 4:1, 3:1, 2:1, or 1:1. The weight ratio of the functionalized polymer to the mineral filler may be at least 1:1, 1:2, 1:3, 1:4, 1:5, 1:10, 1:15, 1:20, 1:25, 1:30, 1:35, 1:40, 1:45, or 1:50.

Conventional Process Aid

The conventional process aid is referred to a polymer that is linear, non-crosslinked and non-functionalized. The composite polymer process aids of the invention may be used with a combination of conventional process aids (i.e., including linear, non-crosslinked non-functionalized polymers), functionalized (but not composite) process aids, and additional fillers. Based on the total weight of the process aids in the composition, the composite polymer process aids of the invention can be used in conjunction with up to 1% by weight of conventional process aids, alternatively, can comprise up to 15% by weight of conventional process aids; preferably can comprise up to 30% by weight of conventional process aids, even more preferably can comprise up to 50% by weight of conventional process aids, based on the total weight of the conventional process aids and the inventive composite polymer process aid in the composition.

Impact Modifier

The composite polymer process aid may include at least one impact modifier, such that the individual particles of the composite process aid includes at least one impact modifier. Non-limiting examples of suitable impact modifiers are sold by Arkema under the trade names of Durastrength® and Clearstrength®. In an embodiment, the step i) further includes blending an aqueous dispersion, an aqueous suspension or an aqueous emulsion of the at least one impact modifier with the functionalized process aid and the inorganic mineral filler.

PVC Resin or Other Thermoplastic Polymer Used with the Composite Process Aids

The PVC resin may be produced at a number of different molecular weights using any method known in the art, including, but not limited to solution, suspension, or emulsion polymerization. The PVC resin used includes but is not be limited to, rigid PVC resins, flexible PVC resins, PVC plastisols, as well as mixtures or combinations formed with one or more other thermoplastic and/or thermoset resins. The PVC resin may be characterized by its molecular weight, which is commonly reported as inherent viscosity (IV) or K-value. In general, the higher the IV or K-value of the PVC resin, the greater the impact strength of the PVC or other thermoplastic resin component made therefrom. However, PVC resins having a high molecular weight are also more difficult to achieve fusion and polymer flow without the use of excessive heat or shear. The molecular weight of the PVC resin used in the formulation from which a PVC component is made can be predetermined based on the mechanical properties and economic factors desired for the final product. Typically, resins within the K-value range of about 56 to about 72; alternatively, about 63 to about 67; alternatively, about 65 are used for forming PVC components having a rigid profile with lower molecular weights being used for foam applications. The molecular weight of the PVC resin is generally less than the molecular weight of the process aids used therewith. The amount of the PVC resin used in the formulation to form the PVC or other thermoplastic resin component may range from about 30 weight % to about 85 weight % of the entire PVC formulation; alternatively between about 50 weight % to about 80 weight %.

Other thermoplastics useful in combination with the composite process aid of the present invention as, for example, a cap layer over a substrate, include but not are limited to acrylic polymers, styrenic polymers, polyolefins, polycarbonate (PC), polyurethane (PU), polyvinylidine fluoride polymers (PVDF), polylactic acid (PLA), and the like, and mixtures thereof. Such other thermoplastics as described herein may be combined with PVC, or used in any combination thereof with or without PVC, and further including the process aids of the invention to form a component with reduced surface gloss.

Styrenic polymers, as used herein, include but are not limited to, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-acrylonitrilebutadiene-styrene (MAB S) copolymers, styrene-butadiene copolymers (SB), styrene-butadiene-styrene block (SBS) copolymers and their partially or fully hydrogenenated derivatives, styrene-isoprene copolymers styrene-isoprene-styrene (SIS) block copolymers and their partially or fully hydrogenenated derivatives, styrene-(meth)acrylate copolymers such as styrene-methyl methacrylate copolymers (S/MMA), and mixtures thereof. A preferred styrenic polymer is ASA. Styrenic copolymers of the invention have a styrene monomer content of at least 10 percent by weight, preferably at least 25 percent by weight The styrenic polymers can also be blended with other polymers to form compatible blends. Examples include ASA blended with PVC, and SAN blended with PMMA.

Acrylic polymers, as used herein, include but are not limited to, homopolymers, copolymers and terpolymers comprising alkyl (meth)acrylates.

The alkyl methacrylate monomer is preferably methyl methacrylate, which may make up from 60 to 100 of the monomer mixture. From 0 to 40 percent of other acrylate, methacrylate, and/or other vinyl monomers may also be present in the monomer mixture. Other methacrylate, acrylate, and other vinyl monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers, styrene and its derivatives. Alkyl (meth) acrylic acids such as (meth)acrylic acid and acrylic acid can be useful for the monomer mixture. Small levels of multifunctional monomers as crosslinking agents may also be used. A preferred acrylic polymer is a copolymer of methyl methacrylate and 2-16 percent of one or more C1-C4 acrylates.

The thermoplastic polymers that are blended with the composite polymer process aid of the invention can be manufactured by any means known in the art, including emulsion polymerization, solution polymerization, condensation polymerization, and suspension polymerization. In one embodiment, the thermoplastic matrix has a weight average molecular weight of between 50,000 and 500,000 g/mol, and preferably from 75,000 and 200,000 g/mol, as measured by gel permeation chromatography (GPC). The molecular weight distribution of the thermoplastic matrix may be monomodal, or multimodal with a polydispersity index greater than 1.5.

Especially preferred thermoplastics for the matrix polymer are styrenic polymers (including SAN, ABS, MABS, ASA, HIPS), acrylic, and PVDF polymers.

Loading of the Composite Polymer Process Aid in Polymers

The amount of composite process aids present in the PVC (or other polymer) formulation may range from about 0.1 phr to about 12 phr in PVC formulations or 0.1 to about 20 phr in other thermoplastic resin components; alternatively, from about 0.1 phr to about 7 phr in PVC formulation or 0.1 to about 10 phr in other thermoplastic resin components; alternatively, greater than or equal to 1 phr, greater than or equal to 2 phr, greater than or equal to 3 phr, greater than or equal to 4 phr. In the context of the present disclosure, the term "phr" means parts per hundred parts of PVC or other thermoplastic base resin, not including the polymer in the composite process aid. The amount of the process aids present in the PVC or other thermoplastic resin formulation may also be expressed as a weight percentage based on the total weight of the PVC or other thermoplastic resin formulation. The use level of the process aids in the PVC formulation may vary depending on the type of PVC formulation selected and the specification set forth for the application in which the PVC or other thermoplastic resin component will be utilized. In other words, the amount of the process aid in the formulation may be predetermined based on the use level necessary to reduce surface gloss to a level that matches the gloss requirements for a given application (i.e., siding, window profile, pipe, or foamed sheet, among others).

Other Additives

The PVC or other thermoplastic formulation including the inventive composite polymer process aid may also include at least one surfactant, dispersing agent, filler, heat stabilizer, internal or external lubricant, other process aids not part of the composite process aid, impact modifier, plasticizer, melt strength additives, flow aids, or pigments.

Impact modifier can be added into PVC compounds directly in a powder form to improve impact strength. Non-limiting examples of suitable impact modifiers are sold by Arkema under the trade names of Durastrength® and Clearstrength®. The impact modifier may included in a range of from 0.5 to 10 parts per hundred resin (phr). When desirable, the PVC formulation used to form the PVC or other thermoplastic resin component may optionally include at least one impact modifier. Impact modifiers enhance the toughness and the resistance of the final product towards cracking or shattering during any subsequent manufacturing operations that are performed on the PVC or other thermoplastic resin component, such as cutting or punching holes in the profile of the component. Impact modifiers typically function by absorbing energy and/or dissipating the energy of a propagating crack. The impact modifiers may include any compatible polymeric particles, including block copolymers and "core-shell particulate" polymers having a soft rubbery core ($T_g<0°$ C.) or hard core ($T_g>0°$ C.) having limited compatibility with the PVC resin and a grafted, compatible, outer polymeric shell. The polymeric particles or compatible outer polymeric shell may comprise methacrylate/butadiene/styrene (MBS), acrylic polymers (e.g., known as acrylic impact modifiers [AIM]), or acrylate/butadiene/methacrylate, and acrylonitrile/butadiene/styrene (ABS); semi-compatible polymers, such as polymers of chlorinated polyethylene (CPE) and ethylene-vinyl acetate (EVA); and other polymers, such as terpolymers of ethylene/vinyl acetate/carbon monoxide, ethylene/propylene/carbon monoxide, polymers of olefins with acrylates, various copolymers of butadiene with acrylonitrile, methacrylates or other rubbers, and even polysiloxane enhanced materials. Preferred shells comprise polymethylmethacrylate (PMMA).

The PVC or other thermoplastic resin formulation may also optionally comprise one or more inorganic fillers or particles, pigments, lubricants, stabilizers, or other desired additives. For example, ultrafine $CaCO_3$ particles (not including $CaCO_3$ particles that that may be included in the composite process aid) may be used as a filler to enhance low temperature impact resistance and increase UV stability in rigid PVC products. Synthetic amorphous silica particles may be incorporated into a PVC formulation to also enhance impact resistance and to provide improved flow properties. Other solid fillers, including, but not limited to, kaolin clay, talc, mica, wollastonite, can calcium metasilicate, may also be incorporated into the formulation simply to reduce the cost of the formulation without substantially affecting the properties exhibited by the PVC or other thermoplastic resin component.

Various pigments may be included to provide color to the PVC or other thermoplastic resin component. These pigments generally exhibit stability at elevated temperatures and to the presence of hydrogen chloride. These pigments may include without limitation various organic pigments or ceramic pigments, such as titanium dioxide and other metal oxides, with or without a silica or alumina surface treatment.

Various lubricants may be included in a PVC formulation in relatively small amounts in order to reduce the resistance to flow of the polymer chains and other ingredients that are present. These lubricants may act as an external lubricant or metal release (slip) agent that enhances the flow of the "hot" material through the processing equipment or as an internal lubricant that reduces the melt viscosity of the material being processed. Lubricants are the main additional component that may be added to the formulation that can help facilitate or drive the fusion of the PVC resin. Several examples of lubricants include without limitation, paraffin waxes and long chain carboxylic acids or their esters, amides, and salts. The amount of lubricant utilized is typically below the level that will cause the occurrence of "plate out". Plate out occurs when the lubricants present in the formulation are squeezed out of the hot bulk material as the extrudate is leaving the die or going through a vacuum calibrator, thereby either causing a plug or deposit of material to occur.

Various stabilizers may be included in a PVC formulation or other thermoplastic formulation to enhance resistance to heat or UV light, to name a few. The heat stabilizers may include, but not be limited to, lead-based or organotin compounds, mixed metal stabilizers, or organic stabilizers, such as epoxies. The UV stabilizers may include, without limitation, hindered amines or phenols.

A thermoplastic compound is provided that comprises, consists of or consists essentially of a thermoplastic matrix homogeneously blended with the composite polymer process aid. The thermoplastic compound may include from 1 phr to 5 phr of the composite polymer process aid. The process aids are present in about 0.1 to about 12 phr in PVC formulations or 0.1 to about 20 phr in other (that is non PVC) thermoplastic resin components. The term "phr" means parts per hundred resin, where "resin" refers to the amount of PVC or other thermoplastic resin the in composition, not including the polymer in the composite process aid. The amount of process aids present in the PVC formulation may range from about 0.1 phr to about 12 phr in PVC formulations or 0.1 to about 20 phr in other thermoplastic resin components; alternatively, from about 0.1 phr to about 7 phr in PVC formulation or 0.1 to about 10 phr in other thermoplastic resin components; alternatively, greater than or equal to 1, 2, 3, 4, 5, 6, 7, or 8 phr. The amount of the process aids present in the PVC or other thermoplastic resin formulation may also be expressed as a weight percentage based on the total weight of the PVC or other thermoplastic resin formulation. The use level of the process aids in the PVC formulation may vary depending on the type of PVC formulation selected and the specification set forth for the application in which the PVC or other thermoplastic resin component will be utilized. In other words, the amount of the process aid in the formulation may be predetermined based on the use level necessary to reduce surface gloss to a level that matches the color requirements for a given application (i.e., siding, window profile, pipe, or foamed sheet, among others).

A thermoplastic component or article of manufacture comprising the thermoplastic compound is provided. The article of manufacture may be an automotive product, a building material, a household or kitchen item, a medical or office supply product, apparel, or packaging for personal care or other consumer products. The thermoplastic component exhibits a gloss reduction of at least 5 points measured at an angle of 60 degrees or less when compared to a similar thermoplastic component not comprising the composite polymer process aid. The resulting PVC component exhibits a gloss reduction of at least 5 points measured at an angle of 60 degrees or less when compared to a similar PVC component in which the process aids are not functionalized. Alternatively, the PVC or other thermoplastic resin component exhibits a gloss reduction of at least 10 points when measured at an angle of 60 degrees or less. The PVC or other thermoplastic resin component that contains the composite polymer process aids may also exhibit a comparable impact property to a similar PVC or other thermoplastic component not containing the composite polymer process aids. This impact property may be without limitation measured as Izod impact or drop dart impact.

Preparation of the Composite Process Aid

Also provided is a process for forming a composite polymer process aid. The process comprises, consists of or consists essentially of the following steps a) and b).

Step a) is blending components i) and ii) to form an aqueous blend. Component i) is an aqueous solution, an aqueous dispersion, an aqueous suspension, or an aqueous emulsion of one or more functionalized polymers comprising at least one base polymer functionalized with about 0.5 weight % to about 35 weight % of at least one of a reactive epoxy, hydroxyl, or carboxylic acid functional group based on the total weight of the functionalized polymer. Component ii) is one or more mineral fillers which may be in the form of an aqueous solution, an aqueous dispersion, an aqueous suspension, an aqueous emulsion, or a dry powder.

Step b) is powderizing the aqueous blend to form the composite polymer process aid. The composite polymer process aid comprises, consists of, or consists essentially of:

1) from 99 to 1 weight percent of the one or more inorganic mineral fillers, and
2) from 1 to 99 weight percent of the one or more functionalized polymers.

The composite polymer process aid formed by this process is in the form of a plurality of individual particles and at least a portion of the individual particles comprise both the a) one or more inorganic mineral fillers and the b) one or more functionalized polymers.

The powderizing step may include spray drying, drum drying, coagulation and drying, vacuum drying, freeze coagulation or freeze drying. The mineral filler, and the aqueous functionalized polymer may be homogeneously blended prior to entering a dryer. The mineral filler, and the aqueous functionalized polymer process aids may be homogeneously blended inside a dryer and powderized in the dryer.

EXAMPLES

Measurement of Glass Transition Temperature for Process Aids

Differential Scanning calorimetry (DSC) is utilized to determine the glass transition temperature (Tg) of the polymers in the process aids prepared according to the teachings of the present disclosure. Each DSC measurement is obtained over the temperature range of −75° C. to 160° C. using a heating rate of 20° C./minute and a cooling rate of 10° C./minute. The Tg is determined as an average of at least two measurements obtained for each sample formulation.

Further description of DSC methodology is found in ASTM E1356-08(2014) (ASTM International, West Conshohocken, PA).

The glass transition temperature (Tg) of the process aids can be determined either as a powder or as a bar formed from powder. The powder may be pressed into a bar upon being subjected to an elevated temperature (e.g., 215° C.) under high pressure (e.g., 25 tons). A total of 10 different process aid samples were analyzed with the average Tg for each sample being within the range of 0° C. to about 150° C. No significant difference in the glass transition temperature measured for the bars and the powders was observed. For example, one specific process aid sample exhibited a glass transition temperature of 85.0° C. in bar form and 83.4° C. in powder form.

Example 1

Preparation of Composite Functionalized Process Aid

Make Composite Functionalized Process Aid 6 kg of an emulsion latex containing 38 weight % solids of a functionalized polymer composed of a 74 weight %/18.5 weight % MMA/BA (methyl methacrylate/butyl acrylate) copolymer functionalized with 7.5 weight % GMA (glycidal methacrylate) was blended with 2.026 kg of ground calcium carbonate (GCC) slurry having 76 weight % solid content with an agitator until homogeneous. The blend was then spray dried to recover the solids and make a composite functionalized process aid containing 60 weight % functionalized polymer and 40 weight % filler.

FIGS. 1(a) and 1(b) show scanning electron microscopy (SEM) images taken of the co-spray dried functionalized composite process aid of the invention. Prior to SEM imaging, the samples were embedded in epoxy cement, cryogenically microtomed, and coated with carbon. The epoxy cement from Ted Pella was used for the embedding. The microtoming was done with glass and diamond knives at a temperature of −100° C. using an RMC 990 rotary microtome and a CRT 900 cryogenic attachment. The samples were coated using a Leica ACE 600 coater with a coating thickness of approximately 5 nm. FIG. 1(a) is an image of a microtomed powder particle using SEM as described above. An X-ray map of the powder particle was also acquired with an Oxford X-Max X-ray microanalysis system attached to a Hitachi SU 8010 SEM. FIG. 1(b) shows the resulting calcium map. The bright part of the image in FIG. 1(b) highlights where calcium is present in the powder particle. The calcium in the powder particle only comes from the calcium in the calcium carbonate in the composite functionalized process aid. The calcium map clearly demonstrates that the calcium carbonate is evenly distributed in the composite process aid powder particle after co-spray drying.

Example 2

Characterization of the Functionalized Polymer in the Composite Functionalized Process Aid of the Invention Test Procedures to Determine Insoluble and Soluble Fractions:

The amount of functionalized polymer in the composite polymer process aid that forms a soluble fraction or remains as an insoluble fraction can be determined using extraction performed with a solvent, such as acetone, tetrahydrofuran (THF), or methylethyl ketone (MEK). The solvent used for the measurements herein was acetone. A predetermined total amount of powdered functionalized polymer was added to a flask along with about 35 grams of acetone as the solvent. The powder and solvent mixture was stirred or shaken for 22 hours upon which time another approximately 30 grams of acetone solvent was added to the flask and then stirred or shaken for an additional 1.5 hours. Then, about 30 grams of the mixture solution was placed into a centrifuge tube and subjected to a centrifugal force at 16,500 rpm for 3-5 hours at a temperature of 5° C. The top portion of the separated mixture solution was added to another tube and then centrifuged a second time under similar conditions. The clear supernatant present in the centrifuge tube was collected. Then 10 mL of this supernatant was placed into an aluminum pan using a serological pipette. The supernatant in the aluminum pan was dried by exposure to heat and the percentage of the insoluble fraction was determined according to Equation 1 below, where $W_f$ is the final weight of the aluminum pan, WI is the initial weight of the aluminum pan, $W_{powder}$ is the weight of the predetermined amount of powder placed in the flask, $V_{solvent}$ is the total volume of solvent placed in the flask, and $V_{supernatant}$ is the volume of the supernatant pipetted into the aluminum pan. The soluble fraction can determined according to Equation 2.

$$\% \text{ Insoluble Fraction} = \{1 - [(W_f - W_i)/W_{powder}] \times (V_{solvent}/V_{supernatant})\} \times 100 \quad \text{(Eq. 1)}$$

$$\% \text{ Soluble Fraction} = 100 - \% \text{ Insoluble Fraction} \quad \text{(Eq. 2)}$$

The functionalized polymer used to make the functionalized composite process aid in Example 1 was determined by this method to contain 81% of insoluble portion and 19% soluble portion.

Measurement of Molecular Weight

The molecular weight associated with the process aids may be determined using gel permeation chromatography (GPC) by various known methods and procedures. The method used herein utilized a differential refractometer equipped with two PL gel mixed A columns and a guard column. An injection volume of 150 microliters (µL) of the soluble portion of the process aids as a THF solution with a concentration of 1.5 mg/mL was injected into the column at a temperature of 35° C. The elution of the process aids through the column was performed using a flow rate of 1.0 mL/min of the THF solvent (HPLC grade). Each sample of the polymer may be tested in either a filtered or unfiltered state. The chromatograms for each tested sample were obtained and analyzed with the molar mass values calculated relative to a poly(methyl methacrylate) (PMMA) calibration curve. Further information regarding GPC methodology is found in ASTM D4001-13 (ASTM International, West Conshohocken, PA).

The molar mass averages of the filtered and unfiltered samples may slightly different from one another. In other words, the filtering of a sample through a 1.0 µm PTFE film may affect the measured molecular weight distribution. The filtering of a sample can remove the extremely high molar mass species thus decreasing the high end of the molar mass distribution. The filtering of a sample can also result in the degradation of the high molar mass species thus increasing the amount of lower molar mass species resulting in higher values for the number average and/or weight average molar mass averages. The molar mass averages are weighted averages based on the number of molecules at each slice, thus increasing or decreasing the amount of molecules of a given molar mass can affect the molar mass averages and distribution.

The soluble portion of the functionalized polymer used to make the composite polymer process aid described in Example 1 was dried upon exposure to heat to make powder for the determination of molecular weight. A total of three injections for the sample was averaged to obtain the weight average molecular weight (Mw). The weight average molecular weight of soluble fraction of the functionalized process aid sample was obtained unfiltered, as well as filtered. The weight average molecular weight (Mw) for the tested sample was 253,000 g/mol in both the unfiltered and filtered state. The polydispersity, which is defined as being the ratio of weight average to number average molecular weight (Mw/Mn), for each tested sample was measured to be about 17.54.

Example 3

Comparison of PVC Sheet Extruded with Conventional Process Aid and Functionalized Process Aid not Including the Inorganic Mineral Fillers and PVC Sheet Extruded with the Composite Polymer Process Aid of the Invention PVC Formulation Compounding:

A masterbatch of a 29,275.0 grams (117.1 phr) of a polyvinyl chloride (PVC) formulation was prepared comprising 25,000.0 grams (100 phr) of a PVC resin (SE-950, Shintech Inc., Houston, TX), 250.0 grams (1.0 phr) of a tin stabilizer (Thermolite® 161, PMC Group Inc., Mount Laurel, NJ), 250.0 grams (1.0 phr) of calcium stearate (COAD 10, Naroc additives, Pomona, CA), 250.0 grams (1.0 phr) of a lubricant (CS-2054, PMC Group Inc., Mount Laurel, NJ), 25 grams (0.1 phr) of a secondary polyethylene lubricant (AC629A, Honeywell International Inc., NJ), 1250.0 grams (5.0 phr) of calcium carbonate (UFT, OMYA, Cincinnati, OH), and 2,250.0 grams (9 phr) of titanium dioxide (R101, Chemours, Wilmington, DE). This PVC masterbatch was then utilized to prepare the PVC formulations in Table 1 containing various combinations of composite polymer process aids, non-composite functionalized process aids and conventional process aids. Impact modifiers were also incorporated in the compositions. The impact modifier utilized in this example was an acrylic polymer (Durastrength® 350, Arkema Inc., King of Prussia, PA) and the conventional process aid utilized in this experiment was an acrylic polymer (Plastistrength® 530, Arkema Inc., King of Prussia, PA). The composite polymer process aid used in this example was the one described in Example 1, and the (non-composite) functionalized process aid was a 74/18.5/7.5 (weight %) MMA/BA/GMA copolymer with an insoluble fraction of 81 weight %. The composite functionalized process aid, (non-composite) functionalized process aid and conventional (non-composite, non-functionalized) process aid were evaluated in PVC formulations to observe and compare processability, surface quality, gloss properties and mechanical properties.

Fusion Properties Measurement:

Polymer processing evaluation was done using a Brabender rheometer, which takes a blended PVC formulation (powder), including composite polymer process aids, functionalized process aids and conventional process aids, and measures fusion torque, fusion time, fusion temperature and equilibrium torque. The methodology for measuring the fusion of PVC compounds using a torque rheometer is a standard practice performed according to ASTM D2538-02 (2010, ASTM International, West Conshohocken, PA). The expanded fusion was measured at 170° C. and 60 rpm torque with 100 ml of PVC compound.

PVC Sheet Extrusion:

PVC compounds made from the PVC formulations were then used in sheet extrusion equipment to prepare PVC sheets. The 40 mil thick sheets were extruded using a Brabender twin screw extruder at a melt temperature of 177-187° C.

Sheet Quality Observation:

After the sheets were made, the sheets were observed by eye to see if there was any surface damage or edge roughness.

Gloss Measurement:

Gloss is associated with the capacity of a surface to reflect more light in directions that are close to the specular. The specular gloss exhibited by the bars and plaques was measured at various angles according to the standard test methodology described in ASTM D523 (2014, ASTM, International, West Conshohocken, PA). The measured gloss ratings were obtained by comparing the specular reflectance of the test bars or plaques to that of a black glass standard.

Impact Measurement:

The sheets were tested for impact strength toughness as determined using a falling dart (i.e., Gardner Impact) methodology as defined according to ASTM D4226 (ASTM International, West Conshohocken, PA).

Results:

Table 1 shows that the inventive composite polymer process aid has comparable gloss values to PVC sheet containing pure 2.3 phr functionalized process aid (i.e., without inorganic mineral filler). Edge tearing was observed when adding 2.3 phr functionalized process aid to PVC formulation. No edge tearing was observed during PVC sheet extrusion with the inventive composite polymer process aid added at up to 3.9 phr. The inventive composite polymer process aid showed much better (lower) gloss values than the PVC sheet extruded with a conventional process aid. In addition, when the inventive composite polymer process aid was added to a PVC formulation, the impact properties of the extruded sheet were the same compared to a control made without the inventive composite polymer process aid while also reducing surface gloss.

TABLE 1

Formulation and properties of PVC sheets containing composite polymer process aid, functionalized process aid and conventional process aid.

| | Composition (weights given in grams) Run No. | | | | |
|---|---|---|---|---|---|
| | *C1 | *C2 | **R1 | **R2 | **R3 |
| PVC master batch phr | 117.1 | 117.1 | 117.1 | 117.1 | 117.1 |
| impact modifier | 4.7 | 4.7 | 4.7 | 4.7 | 4.7 |
| Conventional Process Aid, Comparative | 2.3 | | | | |
| Functionalized process aid | | 2.3 | | | |

TABLE 1-continued

Formulation and properties of PVC sheets containing composite polymer process aid, functionalized process aid and conventional process aid.

| | | Composition (weights given in grams) Run No. | | | | |
|---|---|---|---|---|---|---|
| | | *C1 | *C2 | **R1 | **R2 | **R3 |
| Composite Polymer Process Aid of the Invention | | | | 2 | 2.3 | 3.9 |
| | | Properties | | | | |
| Surface and sheet quality | | Smooth | Edge tear | Smooth | Smooth | Smooth |
| Fusion Time | sec | 58 | 54 | 50 | 52 | 42 |
| Fusion Torque | m-g | 4052 | 3748 | 3824 | 3906 | 3884 |
| Gloss | 60° | 75 | 13 | 20 | 17 | 10 |
| | 75° | 91 | 43 | 63 | 58 | 38 |
| Sheet thickness | mil | 41 | 41 | 39 | 39 | 38 |
| Drop Dart | MFE | 122.4 | 114.4 | 115.2 | 116 | 112.8 |
| | s.d. | 7.63 | 7.63 | 6.73 | 6.14 | 8.67 |
| | MFE/mil | 3.06 | 2.79 | 2.95 | 2.97 | 2.97 |
| | s.d. | 0.19 | 0.19 | 0.17 | 0.16 | 0.23 |

*Comparative
**Invention

[Prophetic Example] Example 4

Comparison of PVC Sheet Extruded with Commercial Matting Agents and PVC Sheet Extruded with the Composite Polymer Process Aid of the Invention PVC sheet is extruded using a PVC formulation with 2 phr of the composite polymer process aid of the present invention and other matting agents including crosslinked PVC, PMMA beads and crosslinked acrylate polymers. Table 2 shows that at the same loading level, PVC sheet containing the inventive composite polymer process aid has lower gloss values than that of PVC sheet prepared containing other matting agents. In addition, when the inventive composite polymer process aid is added to a PVC formulation, the impact properties of the extruded sheet are not compromised. This is in contrast to the other matting agents that when added to PVC formulations not only reduce gloss but also reduce impact properties.

TABLE 2

Formulation and properties of PVC sheets containing composite fpolymer process aid and commercial gloss reduction agents.

| | | Composition (weights given in grams) Run No. | | | |
|---|---|---|---|---|---|
| | | **R3 | *C4 | *C5 | *C6 |
| PVC master batch impact modifier | phr | 117.14 | 117.14 | 117.14 | 117.14 |
| Conventional process aid | | | 0.6 | 0.6 | 0.6 |
| Composite Polymer Process Aid of the Invention | | 2 | | | |
| XL PVC | | | 2 | | |
| PMMA beads | | | | 2 | |
| XL acrylate polymer | | | | | 2 |
| Surface and sheet quality | | smooth | smooth | smooth | smooth |
| Fusion Time | sec | 142 | 136 | 132 | 118 |
| Fusion Torque | m-g | 2800 | 2810 | 2890 | 2950 |
| Gloss | 60° | 19 | 58 | 43 | 46 |
| | 75° | 62 | 88 | 76 | 82 |
| Sheet thickness | mil | 41 | 42 | 42 | 42 |
| Drop Dart | MFE | 120 | 100 | 115 | 143 |
| | s.d. | 3.62 | 0.38 | 1.54 | 3.26 |
| | MFE/mil | 2.93 | 2.38 | 2.74 | 3.4 |
| | s.d. | 0.09 | 0.01 | 0.04 | 0.08 |

*Comparative
**Invention

Example 5

Comparison of Plasticized PVC Sheet Extruded with Functionalized (Non-Composite) Process Aid and Composite Functionalized Process Aid of the Invention A master batch including 25,650.0 grams (135 phr) of a polyvinyl chloride (PVC) formulation was prepared comprising 19,000.0 grams (100 phr) of a PVC resin (SE-950, Shintech Inc., Houston, TX), 380.0 grams (2.0 phr) of a calcium-zinc stabilizer (Naftosafe® CF35677, Akdeniz, Philadelphia, PA), 380 grams (2.0 phr) of a co-stabilizer (Vikoflex® 7170, Cargill, Minneapolis, MN), 3800.0 grams (20.0 phr) of a Dioctyl Terephthalate (Rymsaplas T-4200, Resinas y Materiales, Mexico), 1900.0 grams (10.0 phr) of calcium carbonate (UFT, OMYA, Cincinnati, OH), and 190.0 grams (1 phr) of titanium dioxide (R101, Chemours, Wilmington, DE). This PVC masterbatch was then utilized in a similar fashion as Example 3 to prepare PVC formulations containing composite polymer process aids of the invention. PVC sheet was extruded using the plasticized PVC formulation containing 20 phr of plasticizer as is and with 2 phr of the composite polymer process aid of the present invention. The extrusion temperature was between 177-182° C. Table 3 shows that, the inventive composite polymer process aid reduced gloss values more effectively than plasticized PVC sheet prepared without adding any gloss reduction agent. In comparing the haptic reception of C4 and R7, C4 is a plasticized PVC sheet without any gloss reduction agent, the sheet was shiny, felt like plastic, and a finger did not slide smoothly across the surface. The plasticized PVC sheet, R7, had lower gloss due to the addition of the composite polymer process aid, felt softer to the touch, and a finger slid smoothly across the surface without getting stuck as it did with C4.

TABLE 3

Formulation and properties of plasticized PVC sheets containing composite polymer process aid and as is.

| | | Composition (weights given in grams) Run No. | |
|---|---|---|---|
| | | *C4 | **R7 |
| PVC master batch | phr | 135 | 135 |
| Composite polymer process aid of the Invention | | | 3 |
| Surface and sheet quality | | smooth | smooth |
| Fusion Time | sec | 40 | 38 |
| Fusion Torque | m-g | 2449 | 2756 |
| Gloss | 60° | 79 | 47 |

*Comparative
**Invention

What is claimed is:

1. A composite polymer process aid comprising:
    a) from 99 to 1 weight %, based on the total weight of the composite polymer process aid, of one or more inorganic mineral fillers, and
    b) from 1 to 99 weight %, based on the total weight of the composite polymer process aid of one or more functionalized polymers, wherein the functionalized polymers comprise at least one base polymer functionalized with about 0.5 weight % to about 35 weight %, based on the total weight of the functionalized polymer, of at least one of an epoxy, hydroxyl, β-keto ester, β keto amide, or carboxylic acid reactive functional group;
    wherein the composite polymer process aid is in a form of a plurality of individual particles and at least a portion of the individual particles comprise both the a) one or more inorganic mineral fillers and the b) one or more functionalized polymers,
    wherein the b) one or more functionalized polymers include a soluble fraction and an insoluble fraction, wherein the insoluble fraction ranges from 1% to 90% of the total weight of the one or more functionalized polymers using extraction with acetone as a solvent, and a weight average molecular weight of the functionalized polymers, as measured on the soluble fraction, is greater than 100,000 g/mol, and
    wherein the composite polymer modifier is formed by a process comprising the steps of:
    i) blending the a) one or more inorganic mineral fillers with the b) one or more functionalized polymers to form an aqueous blend, and optionally with c) at least one impact modifier, and
    ii) powderizing the aqueous blend to form the composite polymer process aid.

2. The composite polymer process aid of claim 1, wherein the inorganic mineral filler comprises at least one of calcium carbonate, ground natural calcium carbonate (GCC), precipitated calcium carbonate (PCC), nanosized PCC (NPCC), fumed or precipitated silica, clay, Montmorillonite (nanoclay), zeolite, and perlite.

3. The composite polymer process aid of claim 1, wherein the at least one reactive functional group is derived from one or more monomers comprising at least one of hydroxyl-substituted alkyl esters of (meth)acrylic acid; unsaturated C3-C6 monocarboxylic acids; unsaturated C4 C6 dicarboxylic acids; epoxy group-containing monomers; β-keto esters of (meth) acrylic acid; and β-keto amides of (meth)acrylic acid.

4. The composite polymer process aid of claim 1, wherein the base polymer of the at least one functionalized polymer is derived from one or more (meth) acrylic-containing monomers and, optionally, one or more co-monomers comprising at least one of vinyl-containing monomers, styrene and styrene derivatives.

5. The composite polymer process aid of claim 1, wherein the at least one functionalized polymer comprises a copolymer of at least one alkyl (meth) acrylate and at least one functionalized monomer comprising at least one of glycidyl (meth)acrylate and (meth)acrylic acid.

6. The composite polymer process aid of claim 1, wherein at least one of the following conditions exists: a) at least one of the one or more functionalized polymers is crosslinked; or b) at least one of the one or more functionalized polymers is capable of crosslinking with itself or a thermoplastic polymer.

7. The composite polymer process aid of claim 1, wherein the weight ratio of the functionalized polymer to the inorganic mineral filler is from 75:1 to 1:50.

8. The composite polymer process aid of claim 1, wherein the step i) comprises blending an aqueous solution, an aqueous dispersion, an aqueous suspension, an aqueous slurry, or a dry powder of the a) one or more inorganic mineral fillers with an aqueous solution, an aqueous dispersion, an aqueous suspension or an aqueous emulsion of the b) one or more functionalized polymers to form the aqueous blend.

9. The composite polymer process aid of claim 1, wherein the individual particles further comprise the c) at least one impact modifier and wherein the step i) further comprises blending an aqueous dispersion, an aqueous suspension or an aqueous emulsion of the c) at least one impact modifier with the a) one or more inorganic mineral fillers and the b) one or more functionalized polymers.

10. A thermoplastic compound comprising a thermoplastic matrix homogeneously blended with the composite polymer process aid of claim 1.

11. The thermoplastic compound of claim 10, wherein the thermoplastic matrix is polyvinyl chloride (PVC) or a derivative thereof.

12. The thermoplastic compound of claim 10, comprising from 0.1 phr to 20 phr of the composite process aid.

13. An article of manufacture selected from an automotive product, a building material, a household or kitchen item, a medical or office supply product, apparel, or packaging for personal care or other consumer products, wherein the article of manufacture is comprised of the thermoplastic compound of claim 10.

14. A thermoplastic component comprising the thermoplastic compound of claim 10, wherein the thermoplastic component exhibits a gloss reduction of at least 5 points, measured at an angle of 60 degrees or less when compared to a similar thermoplastic component not comprising the composite polymer process aid.

15. The thermoplastic compound of claim 10, further comprising at least one surfactant, dispersing agent, filler, heat stabilizer, internal or external lubricant, other process aids not part of the composite process aid, melt strength additives, flow aids, impact modifiers not part of the composite process aid, and pigments.

16. A process for forming a composite polymer process aid comprising the steps of:
    a) blending:
    i) an aqueous solution, an aqueous dispersion, an aqueous suspension, or an aqueous emulsion of one or more functionalized polymers comprising at least one base polymer functionalized with about 0.5 weight % to about 35 weight % of at least one of a reactive epoxy, hydroxyl, or carboxylic acid functional group based on the total weight of the functionalized polymer; and ii) one or more inorganic mineral fillers which may be in the form of an aqueous solution, an aqueous dispersion, an aqueous suspension, an aqueous emulsion, or a dry powder;

to form an aqueous blend; and b) powderizing the aqueous blend to form the composite polymer process aid comprising:

1) from 99 to 1 weight % of the one or more inorganic mineral fillers, and
2) from 1 to 99 weight % of the one or more functionalized polymers;

wherein the composite polymer process aid is in a form of a plurality of individual particles and at least a portion of the individual particles comprise both the a) one or more inorganic mineral fillers and the b) one or more functionalized polymers.

17. The process of claim 16, wherein the powderizing step comprises at least one of spray drying, drum drying, coagulation and drying, vacuum drying, freeze coagulation and freeze drying.

18. The process of claim 17, wherein the inorganic mineral filler and the aqueous functionalized polymer are homogeneously blended prior to the powderizing step.

19. The process of claim 16, wherein the inorganic mineral filler and the one or more functionalized polymers are homogeneously blended inside a dryer and powderized in the dryer.

* * * * *